United States Patent
Doepke

(10) Patent No.: US 6,666,787 B2
(45) Date of Patent: Dec. 23, 2003

(54) ELECTROMECHANICAL TRANSMISSION

(75) Inventor: Hubertus Doepke, Eching am Ammersee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 10 days.

(21) Appl. No.: 10/144,044

(22) Filed: May 14, 2002

(65) Prior Publication Data

US 2003/0013569 A1 Jan. 16, 2003

(30) Foreign Application Priority Data

Jul. 12, 2001 (DE) .......................................... 101 33 919

(51) Int. Cl.$^7$ .............................................. F16H 37/06
(52) U.S. Cl. .............................. 475/5; 475/343; 74/339; 74/329
(58) Field of Search .......................... 74/339, 329, 331, 74/359; 475/5, 332, 343

(56) References Cited

U.S. PATENT DOCUMENTS 5,172,602 A * 12/1992 Jurgens et al. ................. 74/335
5,856,709 A * 1/1999 Ibaraki et al. ................. 290/45

FOREIGN PATENT DOCUMENTS

| DE | 19606771 C2 | 8/1997 |
| DE | 19903936 A1 * | 5/2000 |
| DE | 19909424 A1 | 8/2000 |
| DE | 19916489 A1 | 10/2000 |
| DE | 19921064 A1 | 11/2000 |
| DE | 19934696 A1 | 5/2001 |

* cited by examiner

Primary Examiner—Ankur Parekh
(74) Attorney, Agent, or Firm—Crowell & Moring LLP

(57) ABSTRACT

An electromechanical transmission for use with a motor vehicle having an internal combustion engine includes a planetary gear assembly, an electric drive, a changeover gear assembly, and a driven shaft. A planetary gear assembly includes an input shaft and first and second output shafts, wherein the input shaft is coupled to a crankshaft of the internal combustion engine. The electric drive includes first and second rotors connected to two of the input shaft and two output shafts of the planetary gear assembly, respectively. A changeover gear assembly includes first and second gear shafts connected to the two output shafts of the planetary gear, respectively. The changeover gear assembly also includes a first gear wheel pair rotatably mounted to the first gear shaft and a second gear wheel pair rotatably mounted to the second gear shaft. The changeover gear assembly further includes a shifting mechanism operatively associated with each gear shaft and the corresponding gear wheel pair. A driven shaft is coupled to each of the gear shafts via gear engagement.

19 Claims, 7 Drawing Sheets

ELECTROMECHANICAL TRANSMISSION

ELECTROMECHANICAL TRANSMISSION

This application claims the priority of German Patent Document No. 10133919.4, filed Jul. 12, 2001, the disclosure of which is expressly incorporated by reference herein.

BACKGROUND OF THE INVENTION

The invention relates to an electromechanical transmission for motor vehicles.

Automatic transmissions, in which gear changes occur automatically without the involvement of the driver, are used to increase driving comfort. The disadvantages of automatic transmissions are the high manufacturing costs, weight and design volume. A more cost-effective variation of the currently common automatic transmissions is automated changeover gears. However, automated change over gears have the disadvantage that, during the shifting process, the tractive power (the power delivered to the drive wheels) is interrupted. An alternative that has no tractive power interruptions is double-clutch transmissions with two separate countershafts. The disadvantage here is the greater mechanical and thermal strain on the clutches as well as complex control for a jolt-free shifting process.

The object of the invention is to create a transmission for motor vehicles, which has an automatic shifting process without interruption of the tractive power and allows for a broad spectrum of different shifting strategies.

An electromechanical transmission that meets these requirements is described hereinafter.

In an electromechanical transmission according to the invention, a controlled clutch between the internal combustion engine and the shifting transmission is not required. A shifting process can be performed without tractive power interruptions. The input shaft of a planetary gear is connected to the crankshaft of an internal combustion engine. The two output shafts of the planetary gear are connected to the two countershafts of a shifting transmission and to the two rotors of an electric drive, which can function as a motor or a generator. The two rotors can thus function as a conventional starter or a generator, and they are used to control the shifting processes of the connected shifting transmission parts. The electromechanical transmission according to the invention is of low weight and small size.

Other objects, advantages and novel features of the present invention will become apparent from the following detailed description of the invention when considered in conjunction with the accompanying drawings.

DETAILED DESCRIPTION OF THE DRAWINGS

Figure 1A:
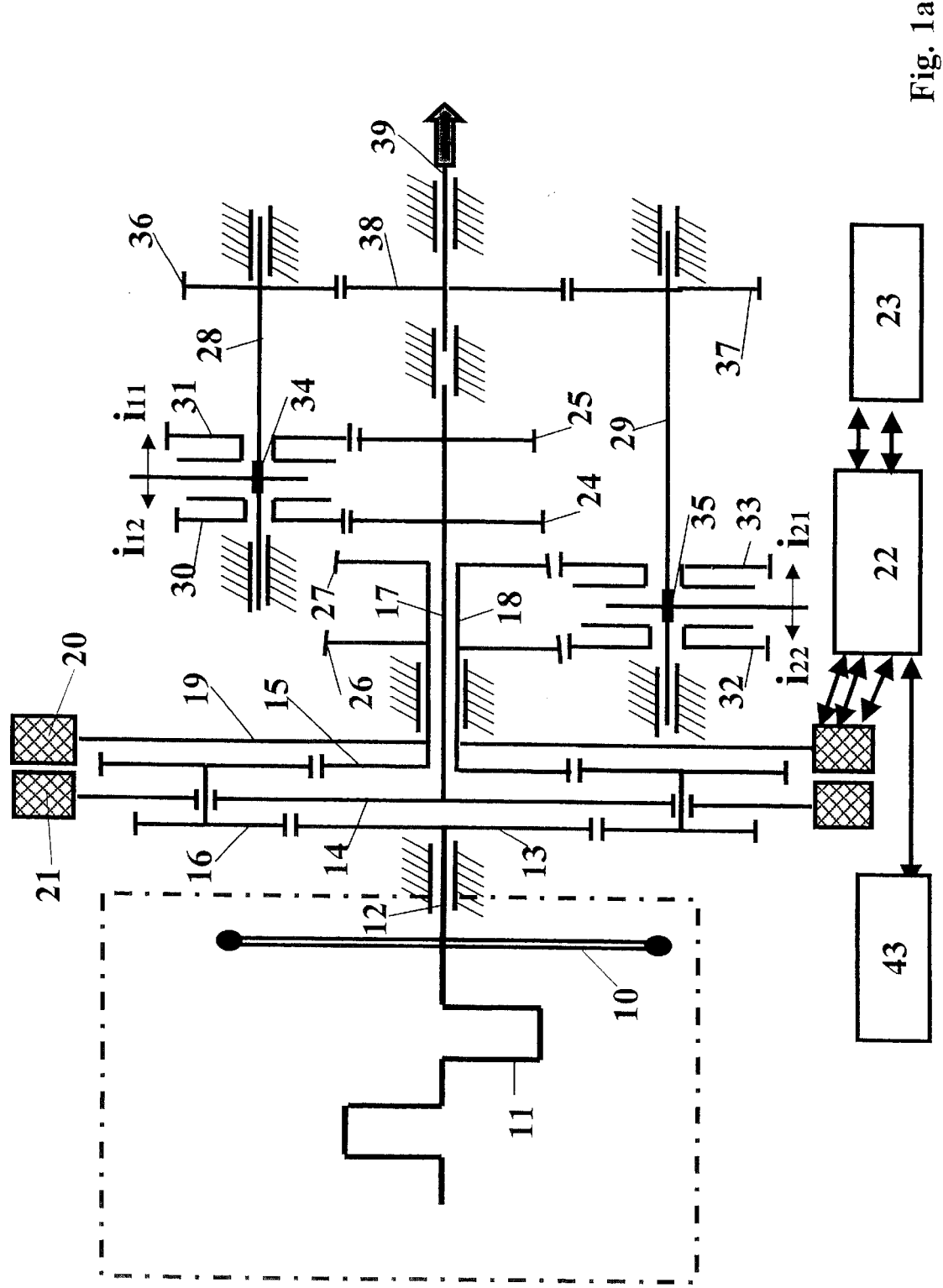
FIG. 1a shows a schematic overall view of an electromechanical transmission coupled to an internal combustion engine.

As shown in FIGS. 1a) and 1b), crankshaft 11 of an internal combustion engine is connected to the input shaft 12 of a planetary gear. The crankshaft 11 has a flywheel 10, and the engine is depicted with a dotted outline. The planetary gear comprises a first central wheel 13, which is connected to the input shaft 12, a bridge 14, and a second central wheel 15. The planetary wheels 16 are designed as step wheels, which engage with the first and second central wheels 13 and 15. A first output shaft 17 of the planetary gear is connected to the bridge 14, and a second output shaft 18, which is a hollow shaft, is connected to the second central wheel 15. On the second output shaft 18 is fastened a support 19 for a rotor 20. On the bridge 14 is fastened a second rotor 21. These two rotors 20, 21 are arranged so as to form an electric drive, wherein one of the two rotors has an energy supply device for generating an electric field.

While the rotor 20 of the depicted embodiment is a field rotor designed as a slip-ring rotor, the other rotor 21 is a permanent magnet or squirrel-cage rotor. The arrangement could also be reversed without affecting its function; that is, the rotor 21 could be the field rotor and the rotor 20 could be the squirrel-cage rotor. In the embodiment shown in FIG. 1a, the rotor 20 is controlled by a power control 22, which may be a so-called four-quadrant control. An accumulator 23 can supply electric energy to the rotor 20 and/or can store the electrical energy generated by the rotor 20. A gear control device 43 is connected to the power control 22.

The depicted planetary gear is a splitting gear, which causes a torque to be divided between two output shafts 17 and 18. On the first output shaft 17 and on the second output shaft 18, respectively, are fixedly arranged two pairs of gear wheels 24, 25, and 26, 27. Two gear shafts 28 and 29 are arranged in parallel to the two coaxial output shafts 17, 18. On the two gear shafts 28, 29, respectively, two pairs of gear wheels 30, 31, and 32, 33, are rotatably mounted. On each of the two gear shafts 28, 29 is furthermore mounted a shift collar 34, 35 in an axially displaceable manner in order to connect fixedly one of the two gear wheels to the respective gear shaft. On each of the two gear shafts 28 and 29 is furthermore fixedly arranged a gear wheel 36, 37. The two gear wheels 36, 37 engage with a gear wheel 38, which is fixedly mounted to a driven shaft 39. The driving power of the internal combustion engine, which is divided via the planetary gear between the two output shafts 17, 18, is transmitted to the driven shaft 39 via the gear wheels pairs 36, 38 and 37, 38. The gear wheels arranged on the two output shafts 17, 18 and the two gear shafts 28, 29 form four different gear wheel pairs, which provide up to seven different gear configurations in connection with the clutch 42 of the embodiment shown in FIG. 1b.

In order to shift gear, the desired gear wheel pair is coupled to the respective gear shaft 28 or 29 through a shift of the shift collar 34 or 35 caused by a gear control device 43. The inputs to the gear control device 43 include the speeds of the crankshaft 11 and the gear output shaft 39, the current load of the internal combustion engine, the current load balance of the accumulator 23, and the gear shift programs selected by the driver. The gear control device 43 calculates the necessary synchronizing speed during the shifting process and controls the operating mode of the power control 22, the function of the shift collars 34 and 35, and the clutch 42, as well as the information for the necessary load of the internal combustion engine. In the embodiment shown, only four gear wheel pairs are provided. However, one with ordinary skill in the art can recognize that a transmission can also have more or fewer gear wheel pairs. The gear wheel pair for the reverse gear was omitted for simplicity reasons.

In the example shown in FIG. 1a, the output shafts 17, 18 are coupled, respectively, to the gear shafts 28 and 29 via two respective gear wheel pairs in the driving mode. On the input, the power of the internal combustion engine is divided between the gear wheel pairs of the gear shafts 28, 29 via the planetary gear and combined at the output on the driven shaft 39 via the gear wheel pairs 36, 38 and 37, 38. Due to the different gear ratios of the two gear wheel pairs of the shifting transmission, different speeds are generated at the output shafts 17, 18 of the planetary gear and thus at the bridge 14 and the disk 19 so that the rotors 20, 21 can be used as a generator to generate electric power.

Figure 4:
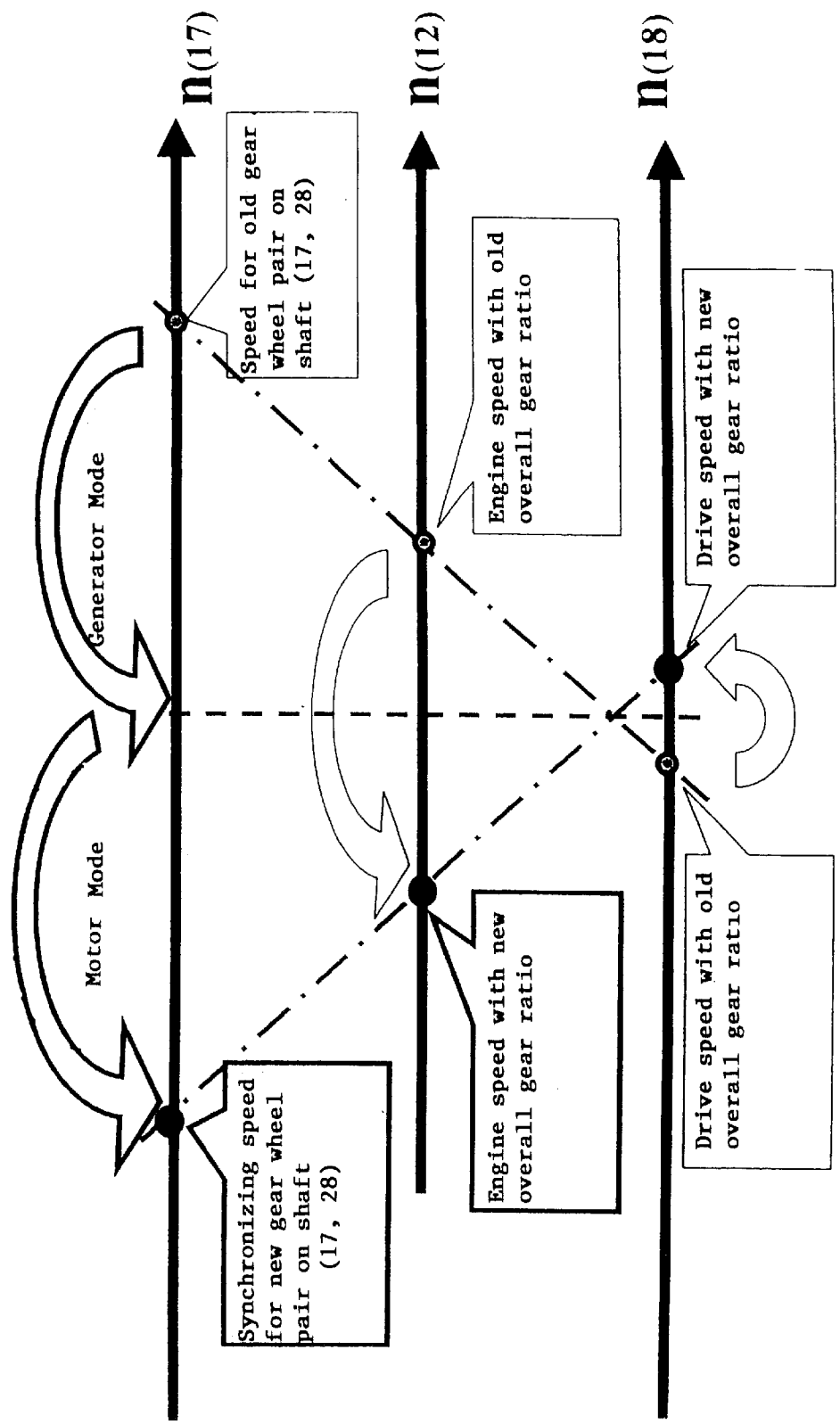
FIG. 4 is a speed nomogram of the shafts of the planetary gear, which illustrates the process of shifting into the next higher gear.

FIG. 4 is a speed nomogram of the shafts 12, 17 and 18 of the planetary gear, which depicts the process of shifting into the next higher gear. For the purpose of shifting gear, the torque of one of the two output shafts 17, 18 of the planetary gear is supported by the electric drive, i.e., by the two rotors 20, 21, in such a way that the gear wheel pair engaging with a shaft, such as the first output shaft 17, is without power, and the gear can be released by disengaging the shift collar 34. The electric drive 20, 21 reduces the speed of the now released output shaft 17 to the synchronizing target speed of the next higher gear wheel pair of the gear shaft 28 so that it can be frictionally connected to the shift collar 34. During this process, depending on the load of the internal combustion engine, it may be necessary that the electric drive 20, 21 initially operates in the generator mode and subsequently in the motor mode or vice versa. The shifting steps during an up-shift of the individual gears are performed alternately on the gear shafts 28-29-28-29. One with ordinary skill in the art can recognize that the above-described processes also apply to shifting into the next lower gear.

A considerable advantage of this electromechanical transmission is that the relative speed of the rotors 20, 21 of the electric drive will always correspond only to the spread between the current and next gears because it is not dependent upon the speed of the internal combustion engine. Thus, the power of the electric drive, required for synchronization during a shifting process, remains low. During a shifting process under full load, the power is proportional to the product of half the torque of the internal combustion engine and the speed difference between the existing and new gear ratios.

Further benefits are that, during a shifting process, the electric drive operates in nearly equal parts in the generator mode and the motor mode and thus recycles the electrical energy generated in the generator mode after a brief intermediate storage. The accumulator 23, such as a capacitor battery, therefore needs only a small capacity. In the above-described electromechanical transmission, the synchronization can be controlled via the gear control device 43 upon driver commands or automatically in different shifting characteristics, such as "comfort" or "sporty." Apart from losses in electric power transmission and intermediate storage, it does not experience any other losses. Thus, this electromechanical transmission fulfills all the functions of a conventional automatic transmission with a hydraulic converter, but without the losses and therefore with a considerably better overall efficiency.

A shifting process without tractive power interruptions represents a hybrid operating mode, which can have different durations depending on the need for shifting comfort. In the case of a suitable design of the gear control device 43 and the accumulator 23, this state can be selected intentionally as a hybrid permanent operating mode of the internal combustion engine and electric drive, wherein the electric drive can be operated either in the generator mode or in the motor mode.

Figure 5:
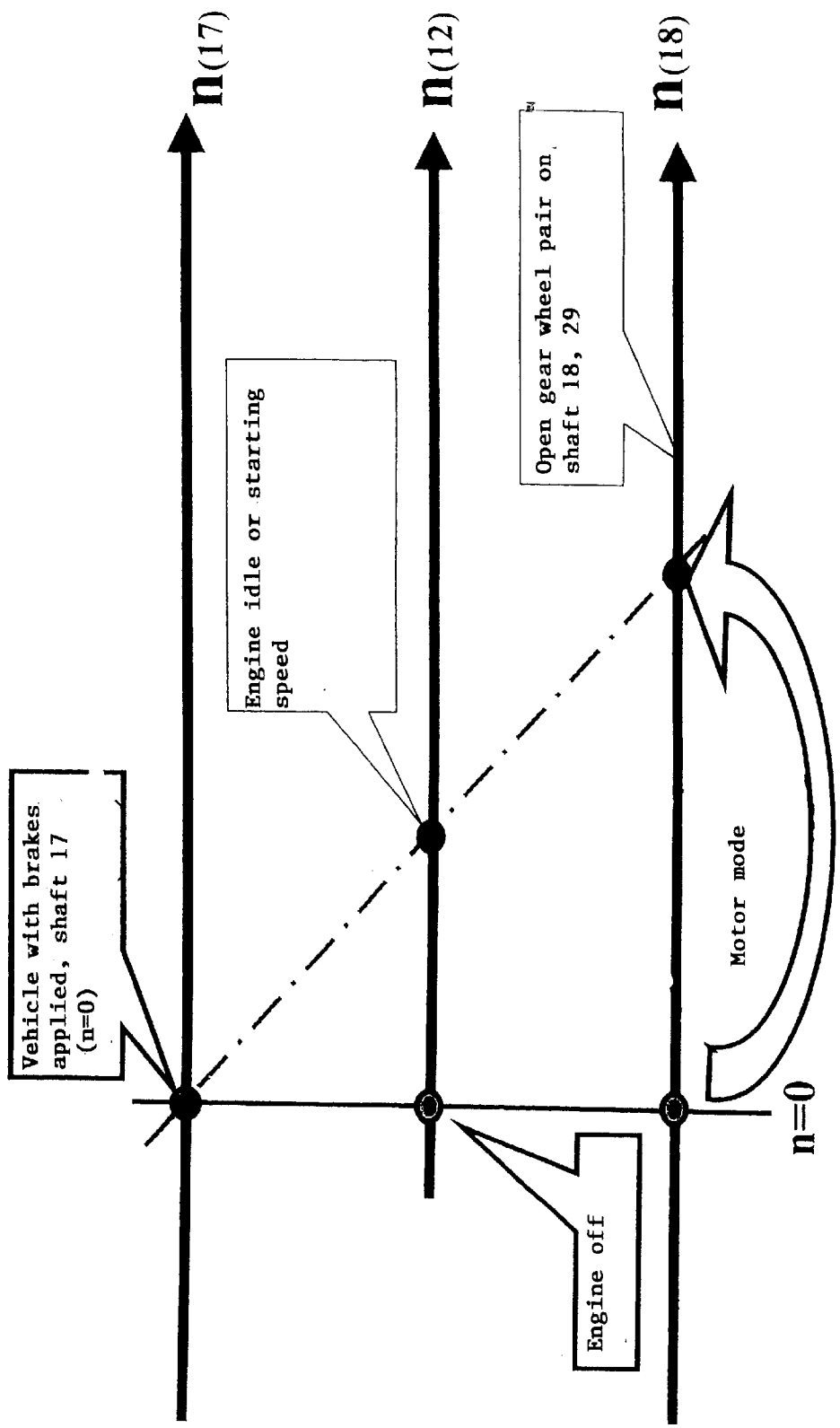
FIG. 5 is similar to FIG. 4, which illustrates the starting process of the motor.

The starting process of the internal combustion engine is shown in FIG. 5. The starting of the engine occurs in the lowest gear, wherein only one of the two gear shafts 28, 29 is engaged (in FIG. 5, the gear shaft 28). The electric drive, formed by the two rotors 20, 21, functions as a starting device by starting the internal combustion engine. Subsequently, when the brakes are applied to stop or slow down the vehicle, the electric drive can be used as a generator.

Figure 6:
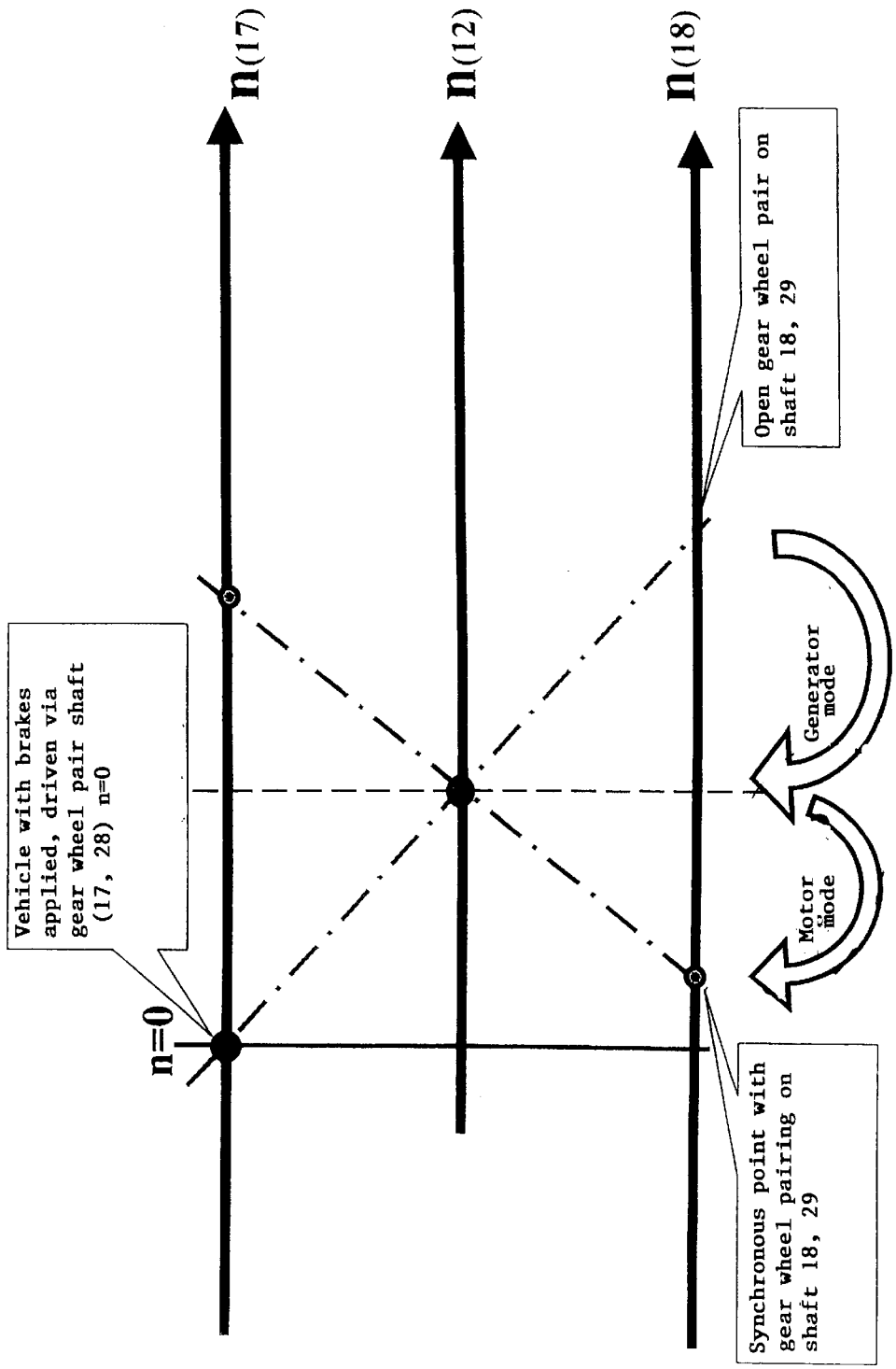
FIG. 6 is also similar to FIG. 4, which illustrates the starting process of the motor vehicle.

The launching of the vehicle is depicted in FIG. 6, which starts from the engine idle speed in the lowest gear with the brakes applied. The starting process corresponds, after the release of the vehicle brakes, to shifting into the next higher gear. Here, the electric drive initially operates in the generator mode and subsequently in the motor mode until the synchronizing speed of the gear wheel pairs of the gear shaft that does not engage has been reached. This gear shaft is then engaged with the assigned shift collar with the appropriate gear wheel pair. The starting process under full load is nearly without loss.

Figure 1B:
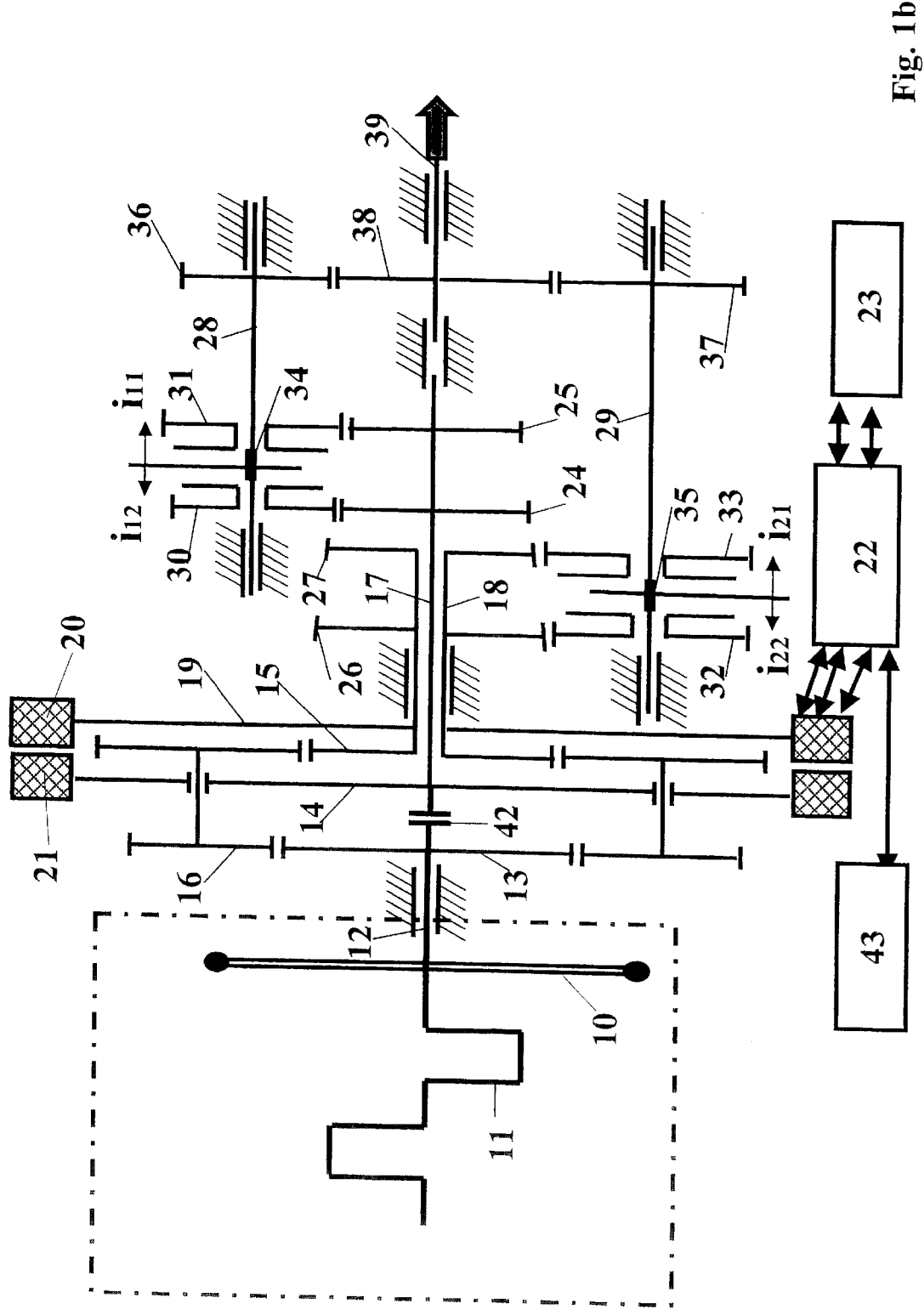
FIG. 1b is similar to FIG. 1a, but shows another version with a clutch.

FIG. 1b shows a variation of the planetary gear depicted in FIG. 1a. This variation includes a clutch 42, which makes it possible to lock the planetary gear and render it inactive. The clutch 42 is preferably arranged between the central wheel 13 and the bridge 14. It is particularly beneficial when a shifting process does not need to maintain tractive power. In that case, the design of the electric drive, with regard to the starting torque, the torque characteristic line, the power control 22 and the accumulator 23, is determined by the torque required during the starting process of the internal combustion engine. The clutch 42 causes a locking of the planetary gear and thus represents a starting aid for starting processes under full load in that it support the generator braking torque of the electric drive. Furthermore, an engaged clutch 42 makes it possible to have gear ratios in which only one gear engages either via the gear shaft 28 or via the gear shaft 29.

Figure 2:
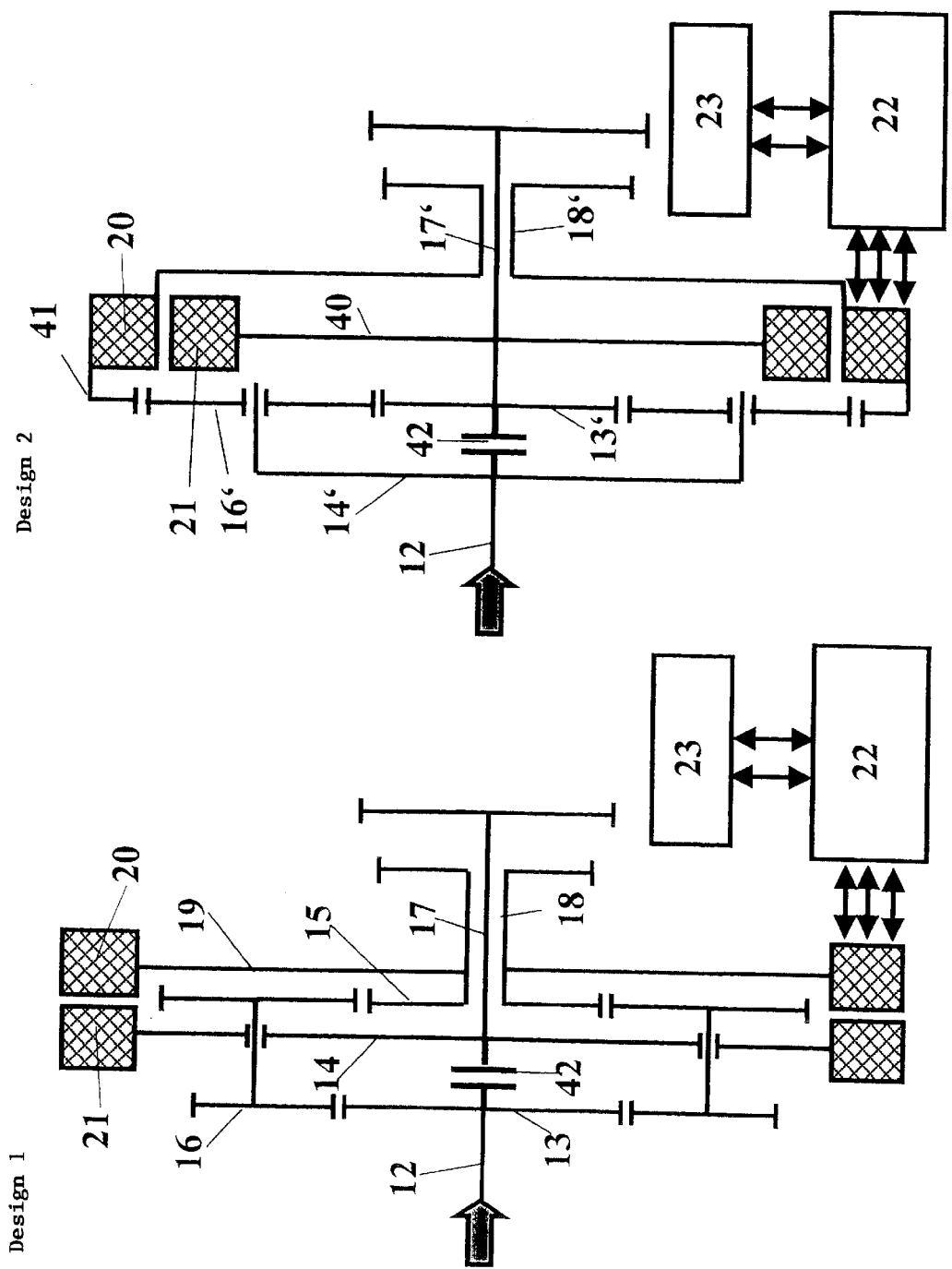
FIG. 2 is a schematic view of two embodiments of a planetary gear arranged between the internal combustion engine and a changeover gear.
Figure 3:
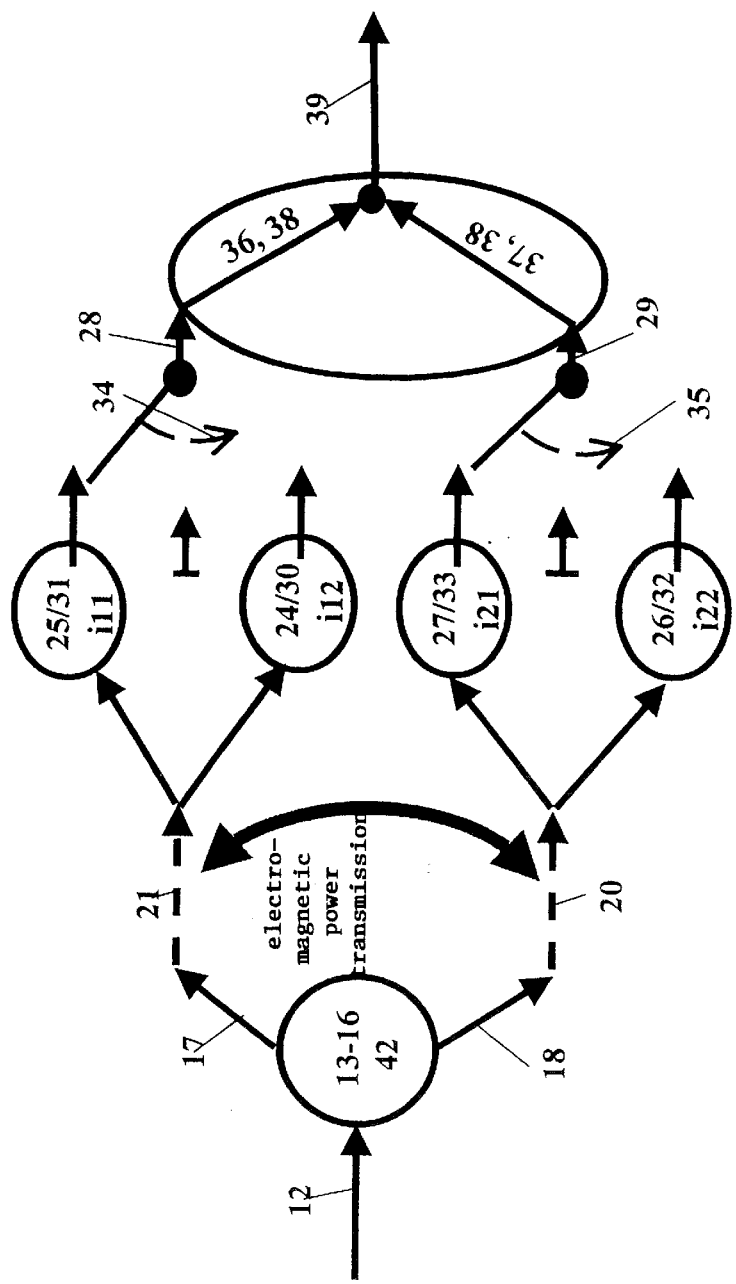
FIG. 3 is a function diagram of the electromechanical transmission with the possible gears pursuant to FIG. 1b.

The planetary gear depicted on the left side of FIG. 2 with a positive status gear ratio corresponds to the embodiment of FIG. 1b. On the right side of FIG. 2a is shown a design of a planetary gear with a negative status gear ratio, on which both the function and effect are identical with the planetary gear shown on the left side of FIG. 2. In the embodiment on the right side, the input shaft 12 is connected to the bridge 14' of the planetary gear. The planetary gears 16' seated in the bridge 14' engage with a central wheel 13' and a hollow wheel 41. The central wheel 13' is connected to a first output shaft 17', and the hollow shaft 41 is connected to a second output shaft 18', which is another hollow shaft. On the first output shaft 17' is fastened a disk-shaped support 40, which supports a rotor 21 of the electric drive, with the rotor 21 being designed as a squirrel-cage rotor. The other rotor 20 of the electric drive, which is a slip-ring rotor and is arranged concentrically with the rotor 21, is fastened to the hollow wheel 41. The electric drive, which is formed by both rotors 20 and 21, is assigned a four-quadrant power control 22 and an accumulator 23. The two output shafts 17' and 18' correspond to the output shafts 17 and 18 shown in FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. An electromechanical transmission for motor vehicles comprising: an input shaft of a planetary gear coupled to a crankshaft of an internal combustion engine, the input shaft and at least one of two output shafts of the planetary gear being directly connected to two rotors of an electric drive, respectively, which are independent from a gear housing, wherein a first one of the two rotors has an energy supply device for generating an electromagnetic field; the first one of the rotors being connected to a four-quadrant power control for controlling the generated electromagnetic field and to an accumulator for storing the electrical energy generated in a generator mode, the four-quadrant power control being connected to a gear control device; the two output shafts of the planetary gear being connected to two gear shafts of a changeover gear that engage a plurality of gear wheel pairs, of which one gear wheel is fixedly connected with one of the gear shafts and another gear wheel is seated in a pivoting manner on the other gear shaft; a shifting mechanism coupled to one of the shafts; for a fixed connection of a selected gear wheel; and a driven shaft coupled via a spur wheel step to the two gear shafts.

2. The transmission of claim 1, wherein:

the planetary gear wheels of the planetary gear are step gear wheels; and a first central wheel of the planetary gear is coupled to the input shaft;

a second central wheel of the planetary gear is coupled to one of the output shafts of the planetary gear; and a bridge of the planetary gear is coupled to the other output shaft.

3. The transmission of claim 1, wherein:

a bridge of the planetary gear is coupled to the input shaft;

a central wheel of the planetary gear is coupled to one of the output shafts; and a hollow wheel of the planetary gear is coupled to the other output shaft.

4. The transmission of claim 2, further comprising a clutch for blocking the planetary gear.

5. The transmission of claim 1, wherein each of the two rotors is fixedly connected via a disk-shaped support to one of the two output shafts of the planetary gear.

6. The transmission of claim 3, further comprising a clutch for blocking the planetary gear.

7. The transmission of claim 2, wherein each of the two rotors is fixedly connected via a disk-shaped support to one of the two output shafts of the planetary gear in a stationary manner.

8. The transmission of claim 3, wherein each of the two rotors is fixedly connected via a disk-shaped support to one of the two output shafts of the planetary gear in a stationary manner.

9. The transmission of claim 4, wherein each of the two rotors is fixedly connected via a disk-shaped support to one of the two output shafts of the planetary gear in a stationary manner.

10. An electromechanical transmission for a motor vehicle having an internal combustion engine, the transmission comprising:

a planetary gear assembly including an input shaft and first and second output shafts, the input shaft being coupled to a crankshaft of the internal combustion engine;

an electric drive including first and second rotors, each rotor being connected to one of the input and output shafts of the planetary gear assembly, wherein the first rotor includes an energy supply device for generating an electric field, and is connected to a four-quadrant power control for controlling the generated electric field and to an accumulator for storing electrical energy generated by the energy supply device, the four-quadrant power control being operatively associated with a gear control device;

a changeover gear assembly including first and second gear shafts connected to the two output shafts of the planetary gear, respectively, the changeover gear assembly also including a first gear wheel pair rotatably mounted to the first gear shaft and a second gear wheel pair rotatably mounted to the second gear shaft, the changeover gear assembly further including a shifting mechanism operatively associated with each gear shaft and the corresponding gear wheel pair, the shifting mechanism having first and second positions, wherein at the first position, the shifting mechanism fixes one gear wheel of the corresponding gear wheel pair to the corresponding gear shaft, and at the second position, the shifting mechanism fixes the other gear wheel of the corresponding gear wheel pair to the corresponding gear shaft; and a driven shaft coupled to each of the gear shafts via gear engagement.

11. The transmission of claim 10, wherein the planetary gear assembly includes a first central wheel coupled to the input shaft, a second central wheel coupled to one of the output shafts of the planetary gear assembly, and a bridge coupled to the other output shaft.

12. The transmission of claim 10, wherein the planetary gear assembly includes a bridge coupled to the input shaft, a central wheel coupled to one of the output shafts, and a hollow wheel coupled to the other output shaft.

13. The transmission of claim 12, comprising a clutch for locking the planetary gear assembly.

14. The transmission of claim 11, comprising a clutch for locking the planetary gear assembly.

15. The transmission of claim 14, wherein each of the two rotors is connected via a disk-shaped support to one of the two output shafts of the planetary gear assembly.

16. The transmission of claim 13, wherein each of the two rotors is connected via a disk-shaped support to one of the two output shafts of the planetary gear assembly.

17. The transmission of claim 12, wherein each of the two rotors is connected via a disk-shaped support to one of the two output shafts of the planetary gear assembly.

18. The transmission of claim 11, wherein each of the two rotors is connected via a disk-shaped support to one of the two output shafts of the planetary gear assembly.

19. The transmission of claim 10, wherein each of the two rotors is connected via a disk-shaped support to one of the two output shafts of the planetary gear assembly.

* * * * *